(12) United States Patent
Appleton

(10) Patent No.: US 7,620,933 B1
(45) Date of Patent: Nov. 17, 2009

(54) LANGUAGE BINDING SYSTEM

(75) Inventor: William C. Appleton, Los Gatos, CA (US)

(73) Assignee: DreamFactory Software, Inc., Los Gatos, CA (US)

( * ) Notice: Subject to any disclaimer, the term of this patent is extended or adjusted under 35 U.S.C. 154(b) by 1305 days.

(21) Appl. No.: 10/939,919

(22) Filed: Sep. 13, 2004

(51) Int. Cl.
*G06F 9/44* (2006.01)
(52) U.S. Cl. .............................. 717/104; 717/132; 707/7
(58) Field of Classification Search ................. 717/104, 717/132; 707/7
See application file for complete search history.

(56) References Cited

U.S. PATENT DOCUMENTS

| | | | |
|---|---|---|---|
| 6,871,201 B2 * | 3/2005 | Yu et al. ......................... | 707/7 |
| 7,031,948 B2 * | 4/2006 | Lee .............................. | 706/14 |
| 7,085,280 B2 * | 8/2006 | Martin, IV .................... | 370/408 |

2008/0154926 A1 * 6/2008 Newman ..................... 707/100

\* cited by examiner

*Primary Examiner*—Andy Ho
(74) *Attorney, Agent, or Firm*—Luedeka, Neely & Graham, P.C.

(57) ABSTRACT

A method for determining a distance between a first node and a second node that share a root node within a structured program. A first node path between the first node and the root node is determined, and a first node depth is counted. A second node path between the second node and the root node is also determined, and a second node depth is likewise counted. One of the node paths that has a highest count is designated as the deepest path, and the other is designated as the shallowest path. The deepest path is descended to a depth that is equal to that of the shallowest path, and a distance count is increased by one count for each node that was descended on the deepest path to reach a depth that is equal to the shallowest path. Both the deepest path and the shallowest path are descended to the root node, and the distance count is increased by two counts for each node that was descended. The distance count is provided as the distance between the first node and the second node.

2 Claims, 2 Drawing Sheets

LANGUAGE BINDING SYSTEM

FIELD

This invention relates to the field of computer programming. More particularly, this invention relates to a method for referencing a desired node when more than one node of the same name exists in a structured program.

BACKGROUND

Many computerized applications depend upon subroutines, also called nodes herein, which perform substantially identical functions. For example, a first node may receive input from a first text input box, and store it as a first named variable. A second node may also receive input from a second text input box, and store it as a second named variable. Both of these two nodes may provide exactly the same function in regard to the text input box which it serves. However, it is typically very important that the input and output of the two nodes not be confused, because such confusion between the two nodes would tend to save one or both of the two variables with an incorrect variable name.

This problem is especially prevalent in graphical programming languages, where various elements, such as the input boxes described above, can be repeatedly pulled off of a menu and dragged onto a form to create a new application, where each of the input boxes serves a different purpose and is associated with a different named variable. Confusion as to which node was to service which text box would be fatal to the proper operation of the resultant application.

With the advent of web applications, such as those developed in XML, such graphical programming, or programs that are developed on the fly based on the input provided by a user, of hierarchically written structured text is becoming more prevalent. Thus, the need to distinguish between nodes that are virtually identical one to another is continually increasing.

One method of ensuring that a given node is distinguished from all other nodes with similar functions is to provide a unique name for every single node in the program. Thus, a given element of the program user interface that is associated with the node, or some other element of the program that desires to access the node, does so by invoking the unique name of the node. Unfortunately, modern programs may make use of many, many such duplicated nodes, and uniquely naming each such node can produce a variety of other problems.

What is needed, therefore, is a system for determining the desired one of several nodes which all provide similar functionality and which may all have the same name.

SUMMARY

The above and other needs are met by a method for determining a distance between a first node and a second node that share a nearest root node within a structured program. A shortest first node path between the first node and the nearest root node is determined, and a first node depth between the first node and the nearest root node along the first node path is counted. A shortest second node path between the second node and the nearest root node is also determined, and a second node depth between the second node and the nearest root node along the second node path is likewise counted. One of the first node path and the second node path that has a highest count is designated as a deepest node path, and the other of the first node path and the second node path that has a lowest count is designated as a shallowest node path. One of the first node path and the second node path is arbitrarily assigned as the deepest node path and the other of the first node path and the second node path is assigned as the shallowest node path when the first node depth is equal to the second node depth.

The deepest node path is descended to a node depth that is equal to that of the shallowest node path, and a distance count is increased by one count for each node that was descended on the deepest node path to reach a node with a depth that is equal to that of the shallowest node path. Both the deepest node path and the shallowest node path are descended to the nearest root node, and the distance count is increased by two counts for each node that was descended on the deepest node path and the shallowest node path to reach the nearest root node. The distance count is provided as the distance between the first node and the second node.

In this manner, a closest of two or more commonly named nodes can be determined and selected as the proper node to which program flow is delivered. By selecting the nearest properly-named node, different copies of the same node do not need to be individually named and referenced. However, even though the different copies of the same node are all given the same name, the proper node is found when a call to that node name is issued.

According to another aspect of the invention there is described a method for selecting one of a second node and a third node as a called node from a first node in a structured program, by selecting as the called node that one of the second node and the third node that has a smaller node distance to the first node.

According to yet another aspect of the invention there is described a method for selecting one of a second node and a third node as a called node from a first node in a structured program. A distance between the first node and the second node is determined according to the following steps. A nearest root node between the first node and the second node is located. A shortest first node path between the first node and the nearest root node is determined, and a first node depth between the node and the nearest root node along the first node path is counted. A shortest second node path between the second node and the nearest root node is determined, and a second node depth between the second node and the nearest root node along the second node path is counted. One of the first node path and the second node path that has a highest count is designated as a deepest node path, and another of the first node path and the second node path that has a lowest count is designated a shallowest node path.

The deepest node path is descended to a node depth that is equal to that of the shallowest node path, and a distance count is increased by one count for each node that was descended on the deepest node path to reach a node with a depth that is equal to that of the shallowest node path. Both the deepest node path and the shallowest node path are descended to the nearest root node, and the distance count is increased by two counts for each node that was descended on the deepest node path and the shallowest node path to reach the nearest root node. The distance count is provided as a second distance between the first node and the second node.

A distance between the first node and the third node is determined by the following steps. A nearest root node between the first node and the third node is located. A shortest first node path between the first node and the nearest root node is determined, and a first node depth between the node and the nearest root node along the first node path is counted. A shortest third node path between the third node and the nearest root node is determined, and a third node depth between the third node and the nearest root node along the third node path is counted. One of the first node path and the third node path that has a highest count is designated as a deepest node path, and another of the first node path and the third node path that has a lowest count is designated as a shallowest node path.

The deepest node path is descended to a node depth that is equal to that of the shallowest node path, and a distance count is increased by one count for each node that was descended on the deepest node path to reach a node with a depth that is equal to that of the shallowest node path. Both the deepest node path and the shallowest node path are descended to the nearest root node, and the distance count is increased by two counts for each node that was descended on the deepest node path and the shallowest node path to reach the nearest root node. The distance count is provided as a third distance between the first node and the third node.

The second node is selected as the called node when the second distance is shorter than the third distance, and the third node is selected as the called node when the third distance is shorter than the second distance.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
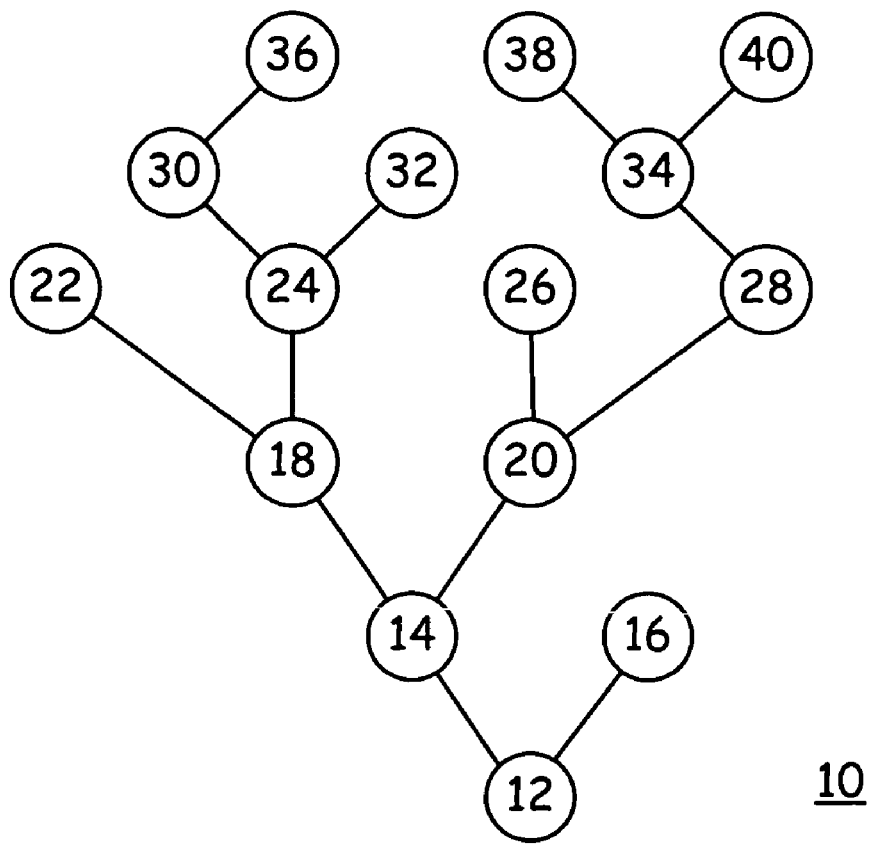
FIG. 1 is a node tree representation of nodes within a structured programming environment.
Figure 2:
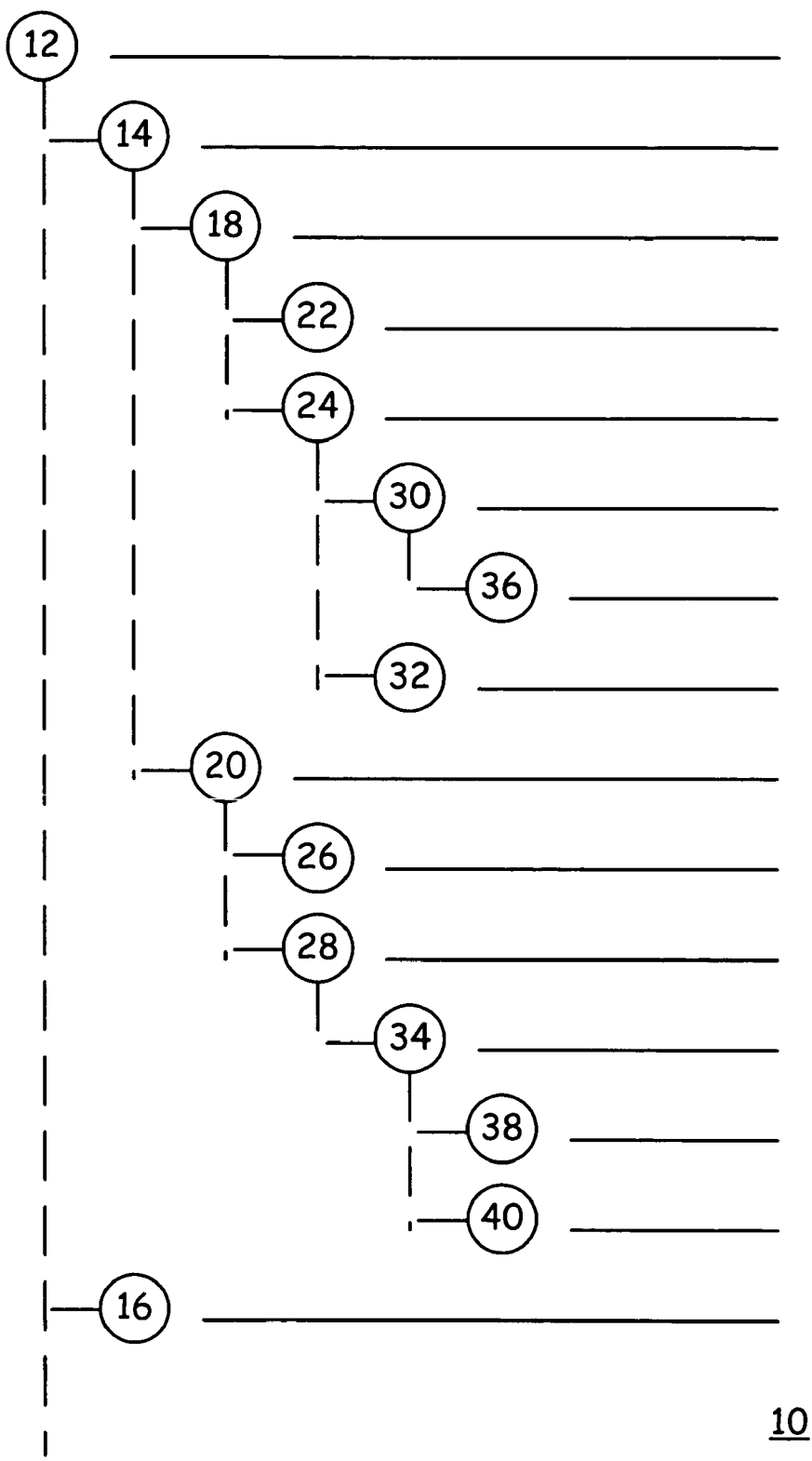
FIG. 2 is a hierarchical subroutine representation of nodes within the same structured programming environment as depicted in FIG. 1.

With reference now to FIG. 1, there is depicted a node tree representation of nodes within a structured programming environment 10. It is appreciated that there are many different ways to represent the program code represented in FIG. 1. For example, FIG. 2 depicts the same structured programming environment 10 in a hierarchical subroutine representation. It is appreciated that, regardless of the means used to represent the program 10, the various embodiments of the present invention are equally applicable for use with the code itself.

As depicted in either FIG. 1 or FIG. 2, the program 10 is represented by various nodes 12-40, which may also be called subroutines. As depicted, various ones of the subroutines are nested within, or in other words are hierarchically dependent from, higher order nodes or subroutines. For example, nodes 14 and 16 depend directly from node 12, node 24 depends directly from node 18 and indirectly from node 12, and node 40 depends directly from node 34 and indirectly from node 20.

As introduced above, problems can arise when two of the nodes, for example nodes 32 and 40, provide the same functionality, but are associated, for example, with different named variables. To continue somewhat the example started above, nodes 32 and 40 might both be text box input routines that associate text with a variable. Thus, it is important that the proper one of nodes 32 and 40 be called when inputting a piece of text, so that the input text is associated with the proper variable.

According to the preferred embodiments, this is accomplished by finding the node with the desired functionality that is closest to the calling node. The desired functionality is most preferably designated with a node name that is unique to the node functionality, but not to each individual node that has the desired functionality. For example, if nodes 32 and 40 both provide the same functionality, then preferably both nodes 32 and 40 have the same name. Thus, in order to implement the various embodiments of the method, a system is needed whereby the distance between two nodes can be determined. According to the most preferred embodiments, the closest node having the desired functionality is selected as the appropriate node to be called.

This is preferably accomplished by a calling node or routine referencing a called node or routine by its name. The program environment then analyzes the program 10 to determine which node having the proper name is the closest node to the calling node. The program environment then passes flow of the program to that closest appropriate node. When the closest appropriate node has been processed, program flow either reverts back to the calling node, or to some other called node, as appropriate.

An example of how the distance between two nodes is preferably determined is now presented. The first step is preferably to determine the distance between each of the two nodes for which the distance is to be determined, and the nearest root node. For example, if the distance between nodes 32 and 40 is to be determined, the nearest common node, or in other words the nearest root node, is first found. In the example as depicted in FIG. 1, the nearest root node is node 14. Although node 12 is also a root or common node for nodes 32 and 40, node 14 is the first common node that is encountered when searching for the roots of nodes 32 and 40, and so it is preferably used in the preferred embodiments of the method as described herein. It is appreciated that in other embodiments there may be some reason to select a root node other than the nearest root node, and that appropriate modifications to the method described below can be made in such embodiments.

Next, the longer of the two node paths is descended until it is at a level that is equal with the other node path. As depicted in FIG. 1, descending the node path indicates a movement in the direction from node 40 toward node 12, while ascending the node path indicates a movement in the direction from node 12 toward node 40.

The node path for node 32, as depicted in FIG. 1, descends respectively through nodes 24 and 18 and ends at node 14, for a total count of three node links. The node path for node 40, as depicted in FIG. 1, descends respectively through nodes 34, 28, and 20 and ends at node 14, for a total count of four node links. There are various methods by which the longer of the two node paths can determined. Most preferably, each node path is counted, much as explained above, to determine the distance between the node of interest and the nearest root node.

These two counts are preferably compared, and one of the node paths is designated as the deepest node path, and the other of the node paths is designated as the shallowest node path. In the example above, the node path for node 40 is four node links long, while the node path for node 32 is three node links long. Thus, the node path for node 40 is preferably designated as the deepest node path, and the node path for node 32 is preferably designated as the shallowest node path. Thus, according to the preferred embodiment of the method, the deepest node path, being the node path for node 40, is preferably descended until the length of each node path is the same. In the example as depicted in FIG. 1, this means that the node path for node 40 is descended to node 34, which is a distance of one node link, which is the amount by which the two node paths differ in this example.

A distance value is preferably incremented one count for each node link which must be descended on the deepest node path in order for both of the two node paths to be at the same depth. Thus, in the example as depicted in FIG. 1, the distance value is incremented by a total of one count at this point in the process. Had the node 40 been at an even higher level than it is, then the distance value would have been incremented by a count of two, three, four, or whatever value was necessary to descend the deepest node path to same level as the shallowest node path.

In some cases the two nodes under investigation have node paths that are exactly the same length. In the preferred embodiments it then no longer matters which node path is the deepest node path and which node path is the shallowest node path. In such a case, the two designations of shortest and deepest node paths are arbitrarily assigned. In other embodiments, the designations are purposefully made based on other criteria that may optimize the flow of the program.

Once the node paths are at the same level, each node path is then descended in parallel until they each arrive at the nearest root node. In the example as depicted in FIG. 1, this is accomplished by descending along the shallowest node path from node 32 to node 24 to node 18 and then finally to the nearest root node 14. At the same time, the deepest node path is descended from node 34 to node 28 to node 20 and then finally to the nearest root node 14. Thus, a total of three node links were descended along each of the two node paths in order to reach the nearest root node. Therefore, according to the preferred embodiments of the invention, two counts are added to the distance value for each node link step that was made to achieve the nearest common node. In the present example, three steps were made, which indicates that a count of six is preferably added to the distance value.

Thus, the distance value count between the two nodes 32 and 40 is determined according to the present method to be seven, indicating that there are seven node links between the two nodes 32 and 40.

In the embodiment where the nearest root node is not used, but some more distant root node is used, then the number of simultaneous steps taken along a common portion of the two node paths is preferably subtracted from the distance value. For example, if node 12 had been selected as the root node, then only one additional count would have been added to the distance value for that portion of the node paths that was identical between node 14 and node 12, and then that one count would be subtracted from the distance value, to again yield a distance value count of seven between nodes 32 and 40.

Most preferably, the programming environment uses such a method to investigate the distance between a calling node and one or more candidate called nodes, to determine which of the candidate called nodes will receive the programming flow. A candidate node is preferably a node that has a name that is equal to the name being called by the calling node. In various embodiments, all such candidate nodes are investigated for their distance from the calling node, and then the closest candidate node becomes the actual called node.

In other embodiments other criteria can be used for determining the called node, in addition to that as just described. For example, if a candidate node is found within a given distance of the calling node, such as one or two or some other number of node links away, then that candidate node is automatically used as the called node, and no additional candidate nodes are investigated. Alternately, only a given number of candidate nodes are investigated, and when that number is reached, then the candidate node having the smallest distance from the calling node is selected as the called node. However, most preferably, all candidate nodes are investigated, and the nearest candidate node of all of the candidate nodes is selected as the called node.

In this manner, proper associations between various nodes or subroutines of a structured programming language can be maintained, while copying various sets of those nodes to any degree, and without having to provide unique names for those copied nodes.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining a distance between a first node and a second node that share a nearest root node within a structured program, the method comprising programming a processor to perform the steps of:
   determining a shortest first node path between the first node and the nearest root node,
   counting a first node depth between the first node and the nearest root node along the first node path,
   determining a shortest second node path between the second node and the nearest root node,
   counting a second node depth between the second node and the nearest root node along the second node path,
   designating one of the first node path and the second node path that has a highest count as a deepest node path,
   designating another of the first node path and the second node path that has a lowest count as a shallowest node path,
   descending the deepest node path to a node depth that is equal to that of the shallowest node path,
   increasing a distance count by one count for each node that was descended on the deepest node path to reach a node with a depth that is equal to that of the shallowest node path,
   descending both the deepest node path and the shallowest node path to the nearest root node,
   increasing the distance count by two counts for each node that was descended on the deepest node path and the shallowest node path to reach the nearest root node, and
   providing the distance count as the distance between the first node and the second node.

2. A method for selecting one of a second node and a third node as a called node from a first node in a structured program, the method comprising programming a processor to perform the steps of:
   determining a distance between the first node and the second node by,
      locating a nearest root node between the first node and the second node,
      determining a shortest first node path between the first node and the nearest root node,
      counting a first node depth between the first node and the nearest root node along the first node path, determining a shortest second node path between the second node and the nearest root node, counting a second node depth between the second node and the nearest root node along the second node path, designating one of the first node path and the second node path that has a highest count as a deepest node path, designating another of the first node path and the second node path that has a lowest count as a shallowest node path, arbitrarily assigning one of the first node path and the second node path as the deepest node path and another of the first node path and the second node path as the shallowest node path when the first node depth is equal to the second node depth, descending the deepest node path to a node depth that is equal to that of the shallowest node path, increasing a distance count by one count for each node that was descended on the deepest node path to reach a node with a depth that is equal to that of the shallowest node path, descending both the deepest node path and the shallowest node path to the nearest root node, increasing the distance count by two counts for each node that was descended on the deepest node path and the shallowest node path to reach the nearest root node, and providing the distance count as a second distance between the first node and the second node, determining a distance between the first node and the third node by, locating a nearest root node between the first node and the third node, determining a shortest first node path between the first node and the nearest root node, counting a first node depth between the node and the nearest root node along the first node path, determining a shortest third node path between the third node and the nearest root node, counting a third node depth between the third node and the nearest root node along the third node path, designating one of the first node path and the third node path that has a highest count as a deepest node path, designating another of the first node path and the third node path that has a lowest count as a shallowest node path, arbitrarily assigning one of the first node path and the third node path as the deepest node path and another of the first node path and the third node path as the shallowest node path when the first node depth is equal to the third node depth, descending the deepest node path to a node depth that is equal to that of the shallowest node path, increasing a distance count by one count for each node that was descended on the deepest node path to reach a node with a depth that is equal to that of the shallowest node path, descending both the deepest node path and the shallowest node path to the nearest root node, increasing the distance count by two counts for each node that was descended on the deepest node path and the shallowest node path to reach the nearest root node, and providing the distance count as a third distance between the first node and the third node, selecting the second node as the called node when the second distance is shorter than the third distance, and selecting the third node as the called node when the third distance is shorter than the second distance.

* * * * *